UNITED STATES PATENT OFFICE.

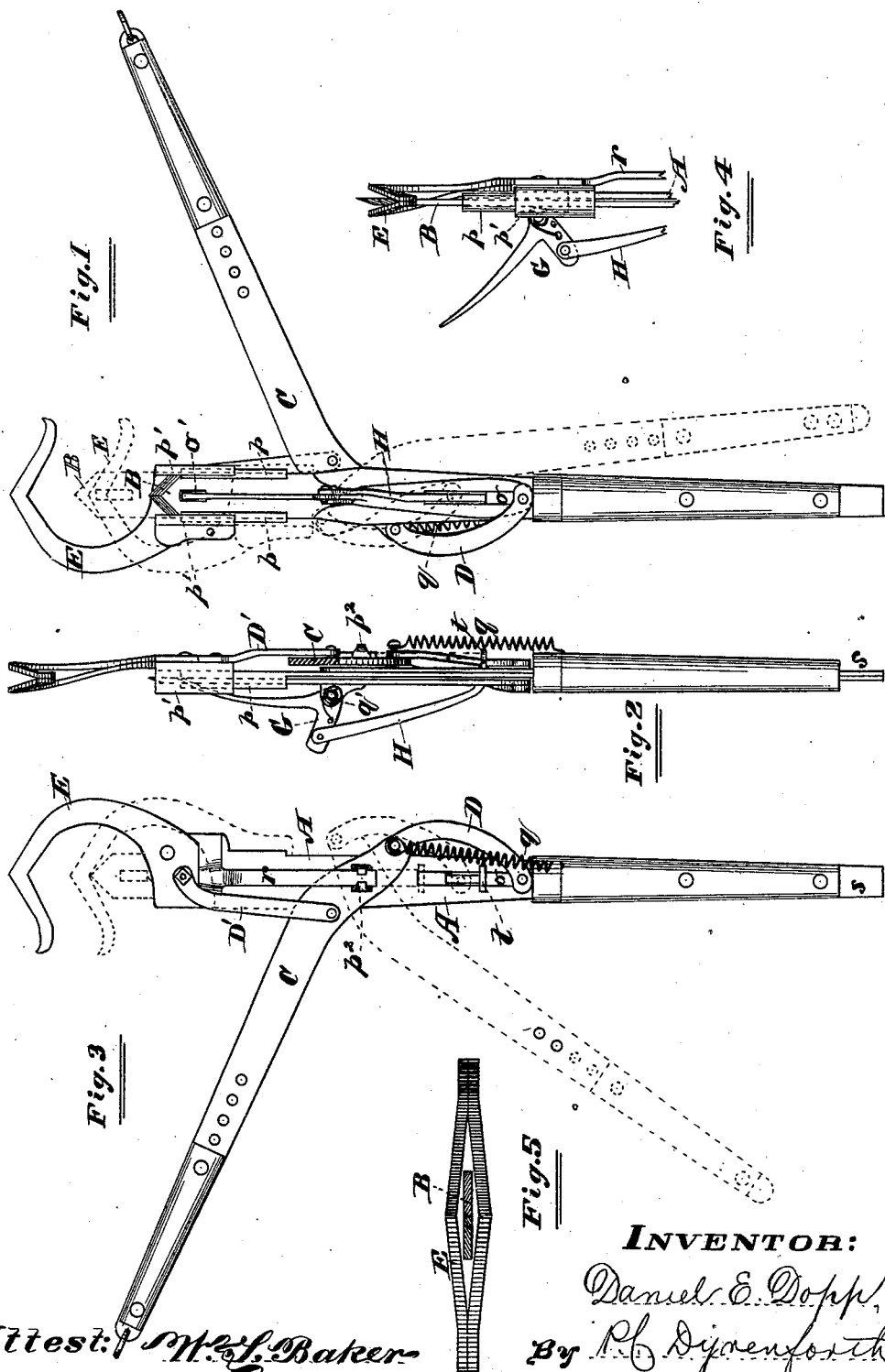

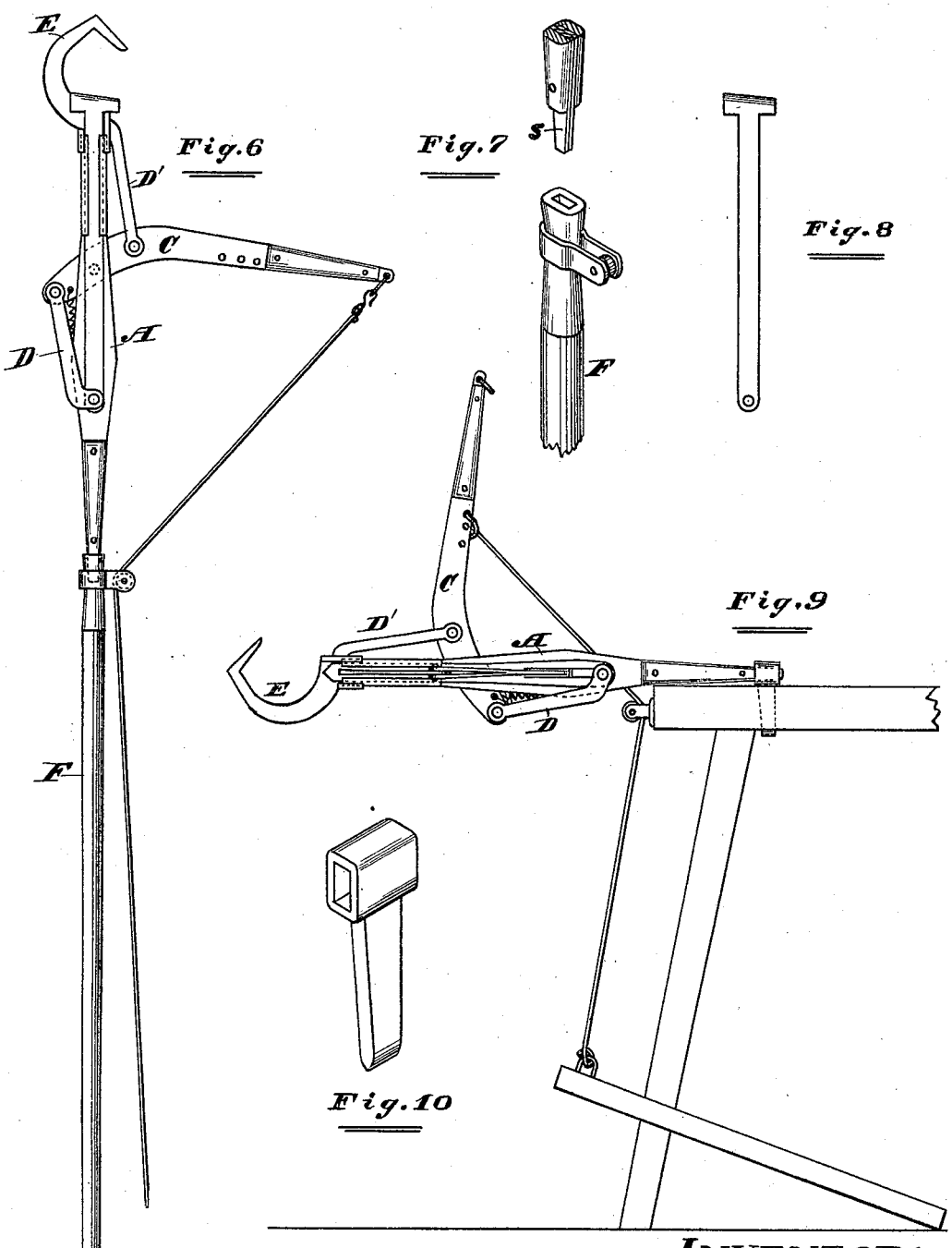

DANIEL E. DOPP, OF WHEELING, ILLINOIS.

IMPROVEMENT IN HUSKING AND PRUNING DEVICES.

Specification forming part of Letters Patent No. 212,544, dated February 25, 1879; application filed December 19, 1878.

*To all whom it may concern:*

Be it known that I, DANIEL E. DOPP, of Wheeling, in the county of Cook and State of Illinois, have invented a new and Improved Husking and Pruning Device; and I hereby declare the following to be a full, clear, and exact description thereof, reference being had to the accompanying drawings, of which—

Figure 1 represents a view of the upper side of my device; Fig. 2, an edge view thereof; Fig. 3, a view of the reverse side from that shown in Fig. 1; Fig. 4, a detail view; Fig. 5, an end view of the hook and cutter; Fig. 6, a view showing the manner in which I adapt my device to pruning trees; Figs. 7 and 8, detail views; Fig. 9, a convenient way of applying the device to corn-husking by means of a bench and treadle, and Fig. 10 a detail of the means for fastening.

My invention relates to a device for husking corn, which is also applicable, with or without a slight modification hereinafter described, to pruning purposes; and it consists, first, in the means for severing the cob from the stalk or the branch from the tree, comprising a sharp incising-knife operated by mechanism hereinafter described, which moves it back and forth longitudinally upon a holder, said holder terminating with a hook to form a bearing for the substance cut, the hook, as well as the cutter, sliding upon the holder, the two being operated by mechanism which moves them simultaneously in opposite directions, whereby the stalk or stem and the cutter act reciprocally against each other; secondly, in combining, with the above severing device, a device for expelling the corn from the husk, comprising a finger which is pivoted at one end to the sliding cutter, and thence extends along the said cutter, terminating near the sharp end of the same, (whereby it enters, together with the said cutter, the incision made by the latter,) and mechanism which causes the free end of the said finger, at the proper time, to fly in a direction away from the said cutter, and thus force out the ear; and, thirdly, in the operating mechanism by which all the above results are brought about, all as hereinafter more fully set forth.

Referring to the drawings, A is a flat metal holder, having one end cased with wood to form a suitable handle to grasp. A short distance beyond the handle is a longitudinal slot, *o*, about one-third [the length of the holder, more or less. The holder, near its farther end, is flanged to form guides *p*, within which the sharp-ended cutter B slides.

C is a curved lever crossing the holder A and pivoted thereto at a point beyond the slot *o*. A handle is formed at the end of the long arm of this lever similar to that upon the holder A, and the short arm is connected to the rear extremity of the sliding cutter B by means of a stirrup, D, branching to each side of the holder A, a single bolt extending through the slot *o*, securing both branches to the cutter. A small roller may, if desired, be put upon the bolt to lessen the friction within the slot.

It will be evident from the foregoing description of this part of my device that as the handle of the lever C is moved to and from the handle of the holder A the cutter slides forward and back upon the holder, and may be made to shoot forward with great force and rapidity. A spring, *q*, connecting the short arm of the lever C with the holder, serves to throw the parts back from the position represented by the dotted lines to that represented by the full lines, and thus withdraw the cutter automatically.

E is a hook projecting beyond the end of the holder A, the purpose of which is to hook around the stem of the thing to be cut and counteract the pressure of the blade. I prefer to form this hook with a slot or opening, as shown in Figs. 4 and 5, for the passage of the cutter, in order that it may bear against the substance cut both above and below the plane of the blade, and thus insure a straight and even cut, no matter how hard and elastic the substance may be.

It is evident that, so far as the foregoing functions are concerned, the hook E might be immovably fixed to the holder, and the cutter be given sufficient sweep to pass beyond it when shot forward by means of the lever C. I find it preferable, however, to give to the hook an action reciprocal with that of the sliding cutter, whereby the latter is made to pass with proportionately greater velocity and force through the interposed substance. The mode by which I accomplish this is clearly shown at Figs. 1 and 3. The base of the hook is flanged over to form guides $p^1$, which slide over the guides $p$, and the said base is prolonged into a flat shank, $r$, which slides within guides $p^2$, formed by a flanged plate upon the bolt which secures the lever C to the holder. The hook is connected to the long arm of the lever C by the stirrup D'. When, therefore, the lever C is operated, the cutter and hook are moved by it in contrary directions, or toward each other, producing the effects above described.

This much of my invention, which performs the function of severing the cob from the stalk, is equally applicable to pruning purposes. In this use of it, however, it is advisable to employ a cutter of the form shown at Figs. 6 and 8, instead of the pointed cutter shown in the other figures, although this is not absolutely necessary. The pruning-cutter there presented, it will be seen, has its edge inclined, in order to produce a draw-cut, and is broader than the other cutter. The shank of the cutter may, if desired, be made in two parts, so that one or the other form of blade may be employed, as circumstances shall render advisable; and it is recommended that the shank be made separable in any case, in order to permit the cutter to be readily detached for sharpening.

For pruning high trees I attach an extension-pole, F, to the handle of the holder A, as shown in Fig. 6. For this purpose I let the metal of the handle extend below the wood, as shown at $s$, Fig. 7, and this is so shaped as to fit a socket in the top of the extension-pole. A cord attached to the long arm of the lever C, and passing through a pulley at the upper end of the extension-pole, permits the device to be operated from the ground.

The construction and operation of the expelling device are as follows: G is a bent lever, having its fulcrum pivoted in a bearing upon the face of the cutter-shank, the long arm of which is tapered, and preferably slightly curved, and lies along the said cutter, terminating near the sharp end thereof, where it is best to have it sit within a recess, as shown, and the short arm of which projects in a direction away from the said cutter. A spring, $q'$, tends to maintain this lever in the position shown at Figs. 1 and 2.

H is a bar pivoted to the short arm of the lever G, and thence extending downward and backward through a slot, $o$, in the shank of the sliding cutter, and also through the slot $o$ in the holder A to the opposite side, where it terminates in a head, $t$, which prevents it from slipping out of the slots. When the hands are brought together, the finger of the lever G is carried forward with the cutter into the incision made by the latter, when the progress of the bar H is brought to a sudden stop, and the direction of its movement completely reversed by the head $t$ of the said bar bringing up against the end of the shaft $r$ of the hook E, which is, of course, moving in a direction opposite to that of the cutter which carries the said bar. The effect of this action, when the handles are closed rapidly together, is to cause the end of the finger to fly outward with great force and suddenness, tearing its way easily through the husks and expelling the ear of corn therefrom.

By bringing the handles forcibly and suddenly together the ear of corn may be shot out to a distance of a dozen feet or more.

For field work the husker (which I ordinarily make about two and one-half feet in length) is best carried with the holder A, or rather the handle thereof, toward the right side, and the handle of the lever C in the right hand. The hook is caught around the stalk, just below the ear, and the handles brought together against the side of the operator, the left hand being used to seize the corn as it comes out.

Fig. 9 shows a manner of using my husker for corn already gathered, the husker being attached edgewise to a bench by means of the pin shown in Fig. 10, which slips over the end of the holder A and fits into a hole in the bench, the lever C being operated by means of a cord and treadle, as represented.

What I claim as new, and desire to secure by Letters Patent, is—

1. The sharp-ended cutter, sliding longitudinally upon a suitable holder, and moved back and forth by means of a stirrup connecting its rear end with one arm of a lever which crosses the said holder, and is pivoted thereto, as shown, in combination with the hook sliding upon the opposite side of the said holder, and projecting beyond the extremity thereof, and moved back and forth in a direction always contrary to that of the cutter by means of a stirrup connecting it with the other arm of the said lever, substantially as described.

2. In combination with the sliding cutter, moved back and forth upon the holder by means of the lever pivoted across the said holder, and the connecting-stirrup, as described, and with the hook projecting beyond the extremity of the said holder, the device for expelling the ear from the husk after it has been severed from the stalk, said device consisting of a finger which is pivoted in a bearing upon the sliding cutter, and which lies along the said cutter, terminating near the sharp end of the same, the said finger being operated by mechanism which causes its free end at the proper moment to move away from the said cutter, substantially as described.

3. A corn-husker in which a holder has a hook at one end to hook around the stalk, and a sharp-ended cutter, sliding longitudinally upon it, operated by means of a lever crossing the said holder and pivoted thereto, said sliding cutter having pivoted upon it a lever, of which one arm lies along the said cutter, terminating near its sharp end, and the other projects away from the said cutter, and is pivoted to one end of a bar, the other end of which bar slides within guides upon the holder, and, when the cutter has moved forward to a given point, brings up against a stop, substantially as described, and for the purpose set forth.

4. The combination, upon a suitable holder, of a sharp-ended cutter, sliding longitudinally in guides upon one side of the said holder, and a hook, E, sliding, with the aid of guides, upon the opposite side of the said holder, and projecting beyond the extremity of the said holder, and a lever, C, crossing the said holder, and pivoted thereto, and having its long and short arm connected, respectively, to the sliding cutter and the sliding hook by means of stirrups D and D', substantially as and for the purpose set forth.

5. In combination with the holder A, sliding cutter B, sliding hook E, having the shank $r$, lever C, and stirrups D and D', the lever G, pivoted in a bearing upon the sliding cutter, and having its short arm attached to a bar, H, which bar passes through slots in the sliding cutter and holder, and terminates with a head, $t$, upon the opposite side of the said holder, which head, as the handles are brought together, meets the extremity of the shank $r$, thus operating the lever G, substantially as described.

6. The combination of the holder A, sliding cutter B, sliding hook E, having the shank $r$, lever C, stirrups D and D', spring $q$, lever G, spring $q'$, and bar H, passing through slots in the cutter B and holder A, and terminating with a head, $t$, substantially as described.

DANIEL E. DOPP.

In presence of—
L. C. WALTERS,
I. M. WEED.